(12) United States Patent
Roberts et al.

(10) Patent No.: US 7,207,532 B1
(45) Date of Patent: Apr. 24, 2007

(54) BOOM STAND

(76) Inventors: Jeffrey A. Roberts, 12851 Floral Ave., Apple Valley, Dakota, MN (US) 55124; John S. Titus, 5331 Frost Point Cir. SE., Prior Lake, Scott, MN (US) 55372; James F. Jenné, 2826 E. 96th St., Inver Grove Heights, Dakota, MN (US) 55077-4939

( * ) Notice: Subject to any disclaimer, the term of this patent is extended or adjusted under 35 U.S.C. 154(b) by 124 days.

(21) Appl. No.: 10/683,725

(22) Filed: Oct. 9, 2003

(51) Int. Cl.
*F16M 13/00* (2006.01)
(52) U.S. Cl. ............... 248/125.1; 248/74.2; 248/411
(58) Field of Classification Search ............ 248/411, 248/412, 188.7, 123.2, 124.1, 124.2, 125.1, 248/125.8, 125.9, 229.11, 68.1, 183.2, 185.1, 248/176.3, 52, 74.2, 316.7; 24/273; D6/498, D6/499; 403/381, 110, 83–85, 109.5
See application file for complete search history.

(56) References Cited

U.S. PATENT DOCUMENTS

| | | | |
|---|---|---|---|
| 1,517,251 A | 12/1924 | Schaaf | |
| 1,611,903 A | 12/1926 | Gelb | |
| 2,129,898 A | 9/1938 | Wright | |
| 2,170,006 A * | 8/1939 | Brandt | 248/188.7 |
| 2,263,668 A | 11/1941 | Woodworth | |
| 2,278,250 A | 3/1942 | Diesbach | |
| 2,292,140 A * | 8/1942 | Lofgren | 24/130 |
| 2,299,683 A | 10/1942 | Curtis | |
| 2,366,950 A | 1/1945 | Wright | |
| 2,481,717 A | 9/1949 | Blair | |
| 2,527,436 A | 10/1950 | Masterson | |
| 2,532,173 A | 11/1950 | Lewis | |
| 2,723,431 A * | 11/1955 | Simon | 24/301 |
| 2,970,798 A * | 2/1961 | Friotchle et al. | 248/229.25 |
| 3,436,482 A | 4/1969 | Pless et al. | |
| 3,454,252 A | 7/1969 | Morgan et al. | |
| 4,258,708 A * | 3/1981 | Gentile | 606/57 |
| 4,396,807 A | 8/1983 | Brewer | |
| 4,407,472 A * | 10/1983 | Beck | 248/89 |
| 4,592,797 A * | 6/1986 | Carlson | 156/574 |
| 4,596,484 A * | 6/1986 | Nakatani | 403/104 |
| 4,671,478 A | 6/1987 | Schoenig et al. | |
| 4,715,571 A * | 12/1987 | Soltow et al. | 248/68.1 |
| 4,773,621 A | 9/1988 | Gebhardt | |
| 4,840,345 A * | 6/1989 | Neil et al. | 248/74.2 |
| 4,900,184 A * | 2/1990 | Cleveland | 403/397 |
| 4,993,961 A * | 2/1991 | Hisatomi et al. | 439/125 |
| 5,137,237 A | 8/1992 | Haskins | |
| 5,146,808 A | 9/1992 | Hoshino | |
| 5,320,312 A * | 6/1994 | Hoenninger | 248/68.1 |
| 5,490,599 A | 2/1996 | Tohidi | |

(Continued)

*Primary Examiner*—Korie Chan
(74) *Attorney, Agent, or Firm*—Albert W. Watkins

(57) ABSTRACT

A boom stand is constructed from a base, extensible stand, pivotal boom support, and boom. The base has arcuately segmented massive anchors that form a perimeter. The arcuately segmented massive anchors are shaped and sized to fit within the perimeter of like bases, to decrease minimum distances between stands during storage or close use, while still providing stability. Over-center clamps provided on the extensible stand are extruded to include unitary cord guides, and are engaged with tube ends to prevent rotation or accidental removal. The pivotal boom support incorporates a disc and elastomeric pads to provide superior locking and vibration reduction, and utilizes in alternative embodiments perimeter and central over-center clamps which further enhance the operation.

6 Claims, 14 Drawing Sheets

U.S. PATENT DOCUMENTS

| | | |
|---|---|---|
| 5,501,419 A | 3/1996 | Huang |
| 5,558,501 A * | 9/1996 | Wang et al. ............. 416/244 R |
| D383,927 S * | 9/1997 | Vassallo ....................... D6/498 |
| 5,757,943 A | 5/1998 | Arledge, Jr. |
| 5,769,556 A * | 6/1998 | Colley .......................... 403/24 |
| 5,806,819 A * | 9/1998 | Martone .................. 248/230.1 |
| 5,946,874 A * | 9/1999 | Roberts ........................ 52/464 |
| 6,007,032 A * | 12/1999 | Kuo ........................ 248/185.1 |
| 6,101,678 A | 8/2000 | Malloy et al. |
| 6,182,580 B1 * | 2/2001 | Barrett et al. .................. 108/64 |
| 6,241,552 B1 * | 6/2001 | Pan ............................. 439/575 |
| 6,305,659 B1 | 10/2001 | Metelski |
| 6,332,621 B1 | 12/2001 | Wu |
| 6,367,749 B2 | 4/2002 | Valiulis |
| 6,481,913 B2 | 11/2002 | Chen |
| 6,662,731 B2 * | 12/2003 | Teppo et al. .................... 108/6 |
| 2002/0066837 A1 | 6/2002 | Dunbar |

\* cited by examiner

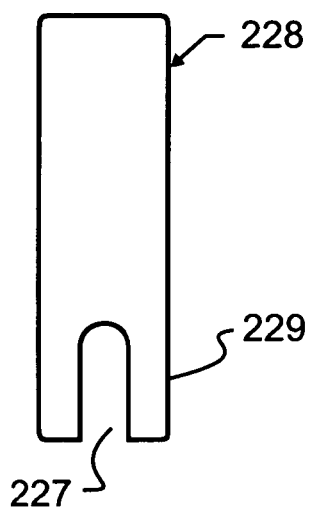
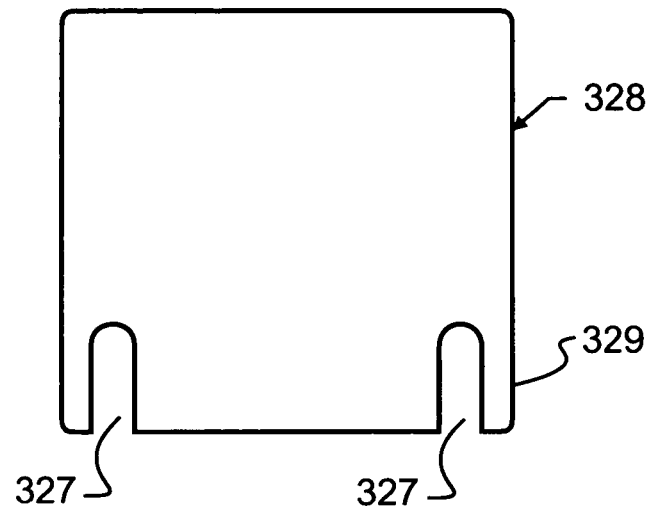
FIG. 12                FIG. 13
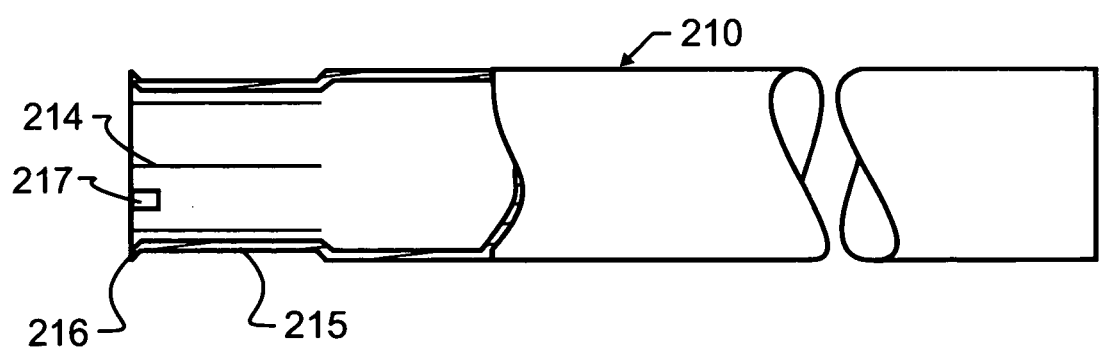
FIG. 14

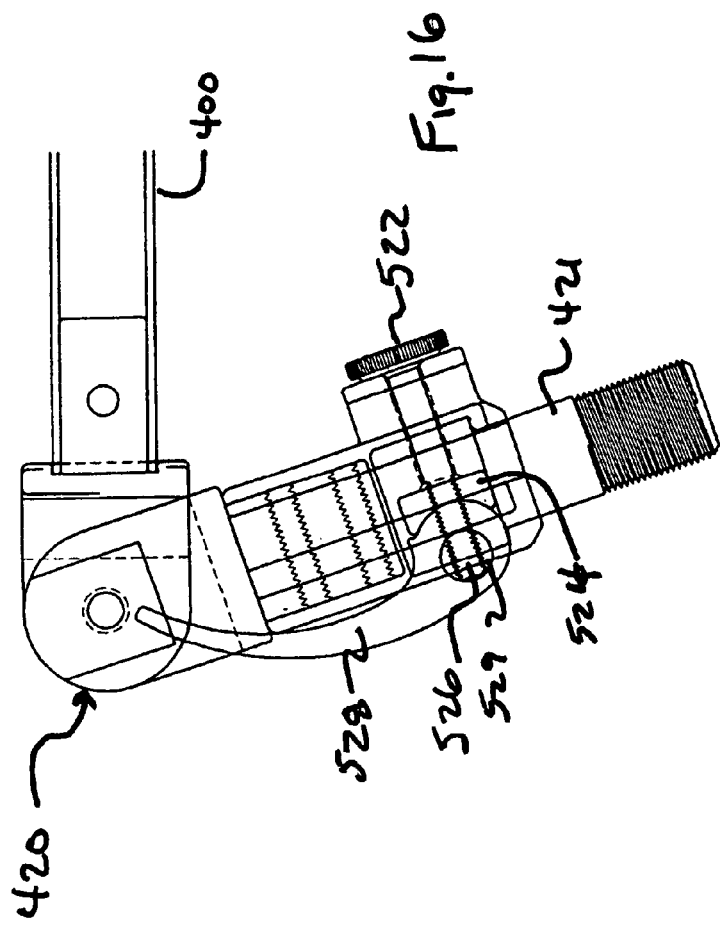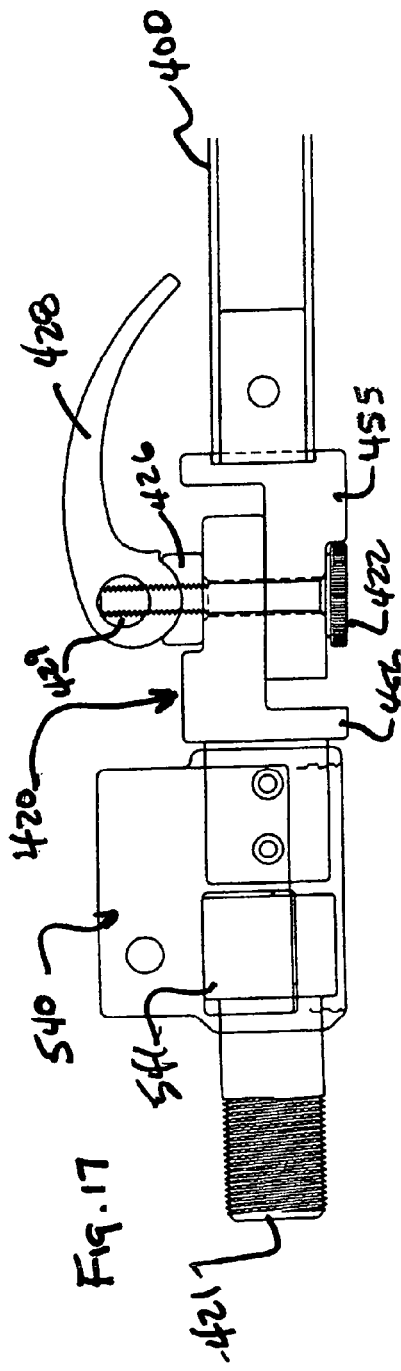

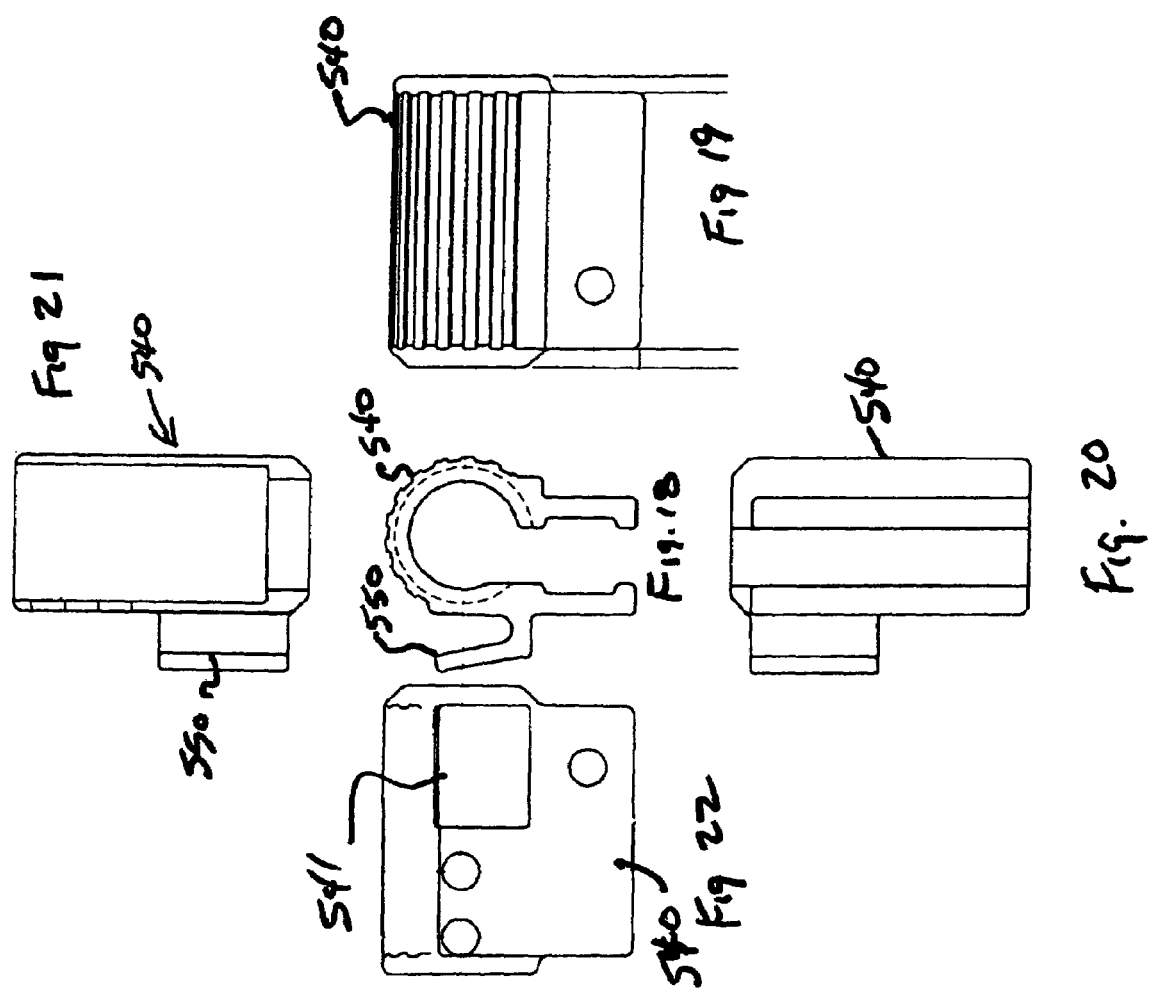

456

BOOM STAND

BACKGROUND OF THE INVENTION

1. Field of the Invention

This invention pertains generally to supports, and more specifically to stands, brackets and bases for supports. In a most preferred manifestation of the invention, the invention pertains to microphone stands.

2. Description of the Related Art

Boom stands, which will be understood herein as vertically rising stands having at least one arm capable of extension in a horizontal direction, are used to support many diverse items. Lights, microphones, cameras, and many other electrical and non-electrical items too numerous to individually list herein are supported thereon. Most commonly, the item to be supported will preferably be easily relocated, as will the stand or at least the boom. This ability to provide relatively adjustable and easily relocated support is in great demand. Frequently, a plurality of these boom stands will be required, such as, for exemplary purposes but not limited thereto, in the case of a musical or theatrical performance where different performers or different parts of a stage are preferred to be either illuminated or coupled into an audio system.

Depending upon the particular item to be supported, the boom stand may have several requirements which must be met to perform satisfactorily. Among these, one common requirement is the ability to readily and rapidly reposition the boom, and then subsequent to the repositioning, anchor the boom into a new fixed position. This ability to readily and rapidly reposition the boom permits the stand to be placed at a convenient location along the ground or floor, without great care in the precise positioning. Once the base is located, then the boom arm may be moved into proper alignment. When any of the moving joints or connections are adjusted into new position, it is most desirable for the positions to be arrived at smoothly, and then locked into place without significant change of position during the locking procedure.

Since the boom may extend some distance from the base, it is generally desirable to incorporate significant mass into the base, to provide some measure of stability during movement or adjustment of the boom and subsequent thereto to best maintain the location of the boom. Unfortunately, in the prior art this often led to the use of a large and very massive base, typically of disc, slightly domed, or similar shape. Such a base is not readily transported, nor can it be used or stored in close arrangement with other bases. Consequently, it is not possible to tightly and compactly arrange, use or store a plurality of similar stands.

To provide more compact storage and lighter weights, a number of designers have resorted to tripod stands. These stands are extremely undesirable for several different reasons. First and foremost, the tripod legs, to avoid the need for substantial mass, must be relatively long. Long legs in turn form a serious hazard for anyone passing near to the boom stand. In the event a boom stand is accidentally knocked over, the item supported thereon may be destroyed. In the case of the performing arts, the microphones that are supported thereon may cost thousands of dollars to replace. Furthermore, the disruption to a performance when a stand is accidentally toppled is highly undesirable.

While the application for the boom stand will to some degree potentially affect the various dimensions and some of the configurations not only of the base, but of the stand as well, including such things as particular lengths or dimensions of the base and the boom, most desirably a boom stand will offer substantial flexibility in both application and physical arrangement and positioning. This flexibility is a desirable part of the benefits of such a stand, which is in part what separates such a stand from a fixture or anchored support.

One of the major factors which controls the applications for which the stand may be used is the coupling between boom and stand. Heretofore in the prior art, one such connection was made as a simple solid connection by thumbscrew or the like to pull two flat surfaces together. This type of connection had almost no resistance to pivotal forces, since the measure of forces upon an arm are calculated by not only the force applied, but also by the distance from the point of rotation. Consequently, when even a small force is applied at a great distance such as at or near the end of a boom arm, the force is magnified by the multiple of relative distance from pivot. Said another way, a first force applied at ten times the distance from a pivot as a second point would require ten times the first force to be applied in an opposite direction at the second point to cancel the first force. In the case of a small knuckle serving as the pivot, this knuckle may be hundreds or even thousands of times closer to the pivot than the end of the boom, and consequently require hundreds or thousands of times the force to prevent rotation about the pivotal axis. As is known in the industry, all too often even minor forces of only a few pounds at the end of the boom overcome the resistance at the knuckle, since these few pounds require thousands of pounds of force to stop such rotation. As a result, the few pounds of force cause the boom to realign undesirably, and therefore require all too frequent re-alignment.

Several different approaches have been attempted to overcome the inherent limitations of these small knuckles or flexible joints. One such approach is illustrated in U.S. Pat. No. 4,671,478 by Schoenig et al, the contents which are incorporated herein by reference. As illustrated therein, the knuckle may comprise two discs designed to mate together at surfaces that are rippled in a complementary radial pattern about the pivot point. As long as both surfaces have complementary geometries, then the engagement of the ridges on one surface occur within the valleys of the opposing surface. To rotate the joint, one must first loosen a bolt passing through the pivot point, to allow the two surfaces to climb up ridge to ridge before passing into the next complementary ridge-valley spacing. When the most desirable ridge-to-valley position is located, then the bolt passing through the pivotal axis may be tightened to prevent any further movement. Since any rotation would require a spreading of the two surfaces, this type of connection frequently has substantial strength and rigidity, so long as the bolt through the pivotal axis is kept secure. Unfortunately, and owing to the discontinuous nature of the engaging surfaces, movement of such a pivotal joint is precarious. Said another way, when the bolt holding the two surfaces tightly in engagement is loosened just beyond the point required to permit ridge-peak to ridge-peak contact between the two surfaces, then all resistance is suddenly and instantaneously lost, and the boom is entirely free to move and drop. So, in order to obtain rotary movement, there is no ability to gradually reduce the frictional forces, but instead the movement occurs instantaneously and sometimes without warning. A number of additional patents illustrate the various techniques that have been tried with these relatively small knuckles, including Lewis in U.S. Pat. No. 2,532,173; Hoshino in U.S. Pat. No.

5,146,808; Arledge in U.S. Pat. No. 5,757,943; and Dunbar in 2002/0066837, the contents of each which are incorporated herein by reference.

Other artisans have proposed addressing the force amplification or leveraging by providing an anchoring or locking arrangement which circumscribes the pivotal axis, but which is displaced therefrom by some radial distance. Exemplary of such an arrangement is Masterson in U.S. Pat. No. 2,527,436, the contents which are incorporated herein by reference. While this arrangement requires somewhat more space than the knuckle would, the relative distances between pivot and boom end versus pivot and locking point are substantially reduced, and then the amount of force and also the amount of ingenuity required to operate the device tend to be better kept in check. Nevertheless, these arrangements still place significant forces upon a small thumbscrew or the like, and such arrangement will invariably fail when relatively meager forces are applied at the ends of the boom. Additional patents which illustrate this type of mount include Schaafin U.S. Pat. No. 1,517,251; Gelb in U.S. Pat. No. 1,611,903; Wright in U.S. Pat. No. 2,129,898; Diesbach in U.S. Pat. No. 2,278,250; Curtis in U.S. Pat. No. 2,299,683; Wright in U.S. Pat. No. 2,366,950; Blair in U.S. Pat. No. 2,481,717; Gebhardt in U.S. Pat. No. 4,773,621; Wu in U.S. Pat. No. 6,332,621; and Chen in U.S. Pat. No. 6,481,913, the contents of each which are incorporated herein by reference. With each of these designs, any vibrations that are induced in the shaft will be directly transferred through to the boom and ultimately to the device. Where sensitive electrical or electronic devices are placed upon these mounts, including such devices as microphones, lights, cameras or the like, this transmission of vibration is clearly undesirable.

SUMMARY OF THE INVENTION

In a first manifestation, the invention is a microphone boom stand uniquely adapted to provide both rigid support and vibration damping. A stand rises from a base and elevates a boom adapted to support a microphone in a location horizontally displaced from the stand. A clamp secures boom to stand, and selectively controls pivotal relative motion between boom and stand. The clamp is convertible between clamping and pivoting. The clamp has a core, a backing member, and at least one elastomeric member between core and backing member that is in frictional engagement with core and backing member when the clamp is arranged to prevent motion between boom and stand.

In a second manifestation, the invention is, in combination, a boom stand base having a center and an outer perimeter spaced from said base center and a boom stand having a boom for supporting an object at a location offset from said base center in a direction perpendicular to gravity and offset from base center in a direction parallel to gravity. The improvement comprises a plurality of arcuate massive anchors extending generally about and spaced from base center by arms extending therefrom. Adjacent ones of the arms and adjacent ones of the plurality of arcuate massive anchors primarily bound openings therebetween. At least one of the arcuate massive anchors is sized to fit within a space defined by least one of the bounded openings and a planar surface beneath and supporting the plurality of arcuate massive anchors.

In a third manifestation, the invention is a boom stand base. The base has first, second and third arms extending radially from a center point and subtending a circle into similar angular displacements. First, second and third massive anchors are attached on the respective ends of the first, second and third arms, each at a location distal to the center point, and extending generally arcuately and discontinuously about a circular circumference generally concentric with the center point. Each of the first, second and third massive anchors are spaced from adjacent massive anchors by an amount greater than that required to permit an object dimensioned similar to at least one of the first, second and third arms to pass therebetween and spaced from adjacent massive anchors by an amount less than a distance required to pass an object sized similar to the first second and third massive anchors therebetween at the object's maximum dimension.

In a fourth manifestation, the invention is a clamp for clamping a first tube concentrically about a second tube to form a generally fixed mechanical relationship therebetween. The clamp has a substantially constant operative cross-sectional shape between a first longitudinal end and a second longitudinal end. An inner surface is operative to apply compressive forces against the first tube, and a means is provided for compressing the inner surface. A cord retention clip is formed unitarily with the clamp exterior surface, operatively extending between first longitudinal end and second longitudinal end, and adapted to elastically retain an electrical cord therein.

In a fifth manifestation, the invention is a boom stand uniquely adapted to provide rigid support and smooth adjustment. A clamp has a clamping arrangement that secures a boom adapted to support a load in a location horizontally displaced from a riser to the riser. The clamp also has a pivoting arrangement which permits relative motion between boom and riser, and is convertible between clamping and pivoting arrangements. The clamp includes both a core and a backing member.

OBJECTS OF THE INVENTION

Exemplary embodiments of the present invention solve inadequacies of the prior art by providing a boom stand having a massive but limited base which is readily interweaved with other bases of like construction, an over-center clamping apparatus for securing boom to stand that includes elastomeric retention and isolation and integral cable guides, and over-center clamps that control extension or retraction of the stand and that also include integral cable guides.

A first object of the invention is to provide a movable and yet densely stored support stand. A second object of the invention is to ensure rigid orientation of boom to stand even under substantial forces, while still providing the benefits of elastomeric coupling and isolation. Another object of the present invention is to obtain the foregoing objects using mechanisms which are intuitive to operate and which may be operated quickly. An additional object of the invention is to provide an operating mechanism for positioning the boom which operates smoothly, and which provides gradual and predictable variation in the amount of force resistant to pivoting. A further object of the invention is to provide a stand which is uniquely suited to securely supporting even the most expensive and sensitive equipment in a safe manner. Yet another object of the present invention is to reduce the likelihood of entanglement prevalent in the prior art.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 12 illustrates a preferred embodiment clamp handle designed in accord with the teachings of the present invention from a top view.

FIG. 13 illustrates a second preferred embodiment clamp handle designed in accord with the teachings of the present invention from a top view.

FIG. 14 illustrates a preferred embodiment tube cooperative with an extension designed in accord with the teachings of the present invention from a side partial cut-away view.

FIG. 16 illustrates a preferred coupler and joint from a side view, designed in accord with the teachings of the present invention and operable in association with the stand assembly of FIG. 1.

FIG. 17 illustrates the preferred coupler of FIG. 16 from a top view with the coupler and joint arranged linearly, and with the coupler clamp hardware removed for ease of view and understanding.

FIGS. 18, 19, 20, 21 and 22 illustrate a preferred microphone pivot clamp from end, side, bottom, top cross-section and side cross-section views, respectively.

DESCRIPTION OF THE PREFERRED EMBODIMENT

Figure 1:
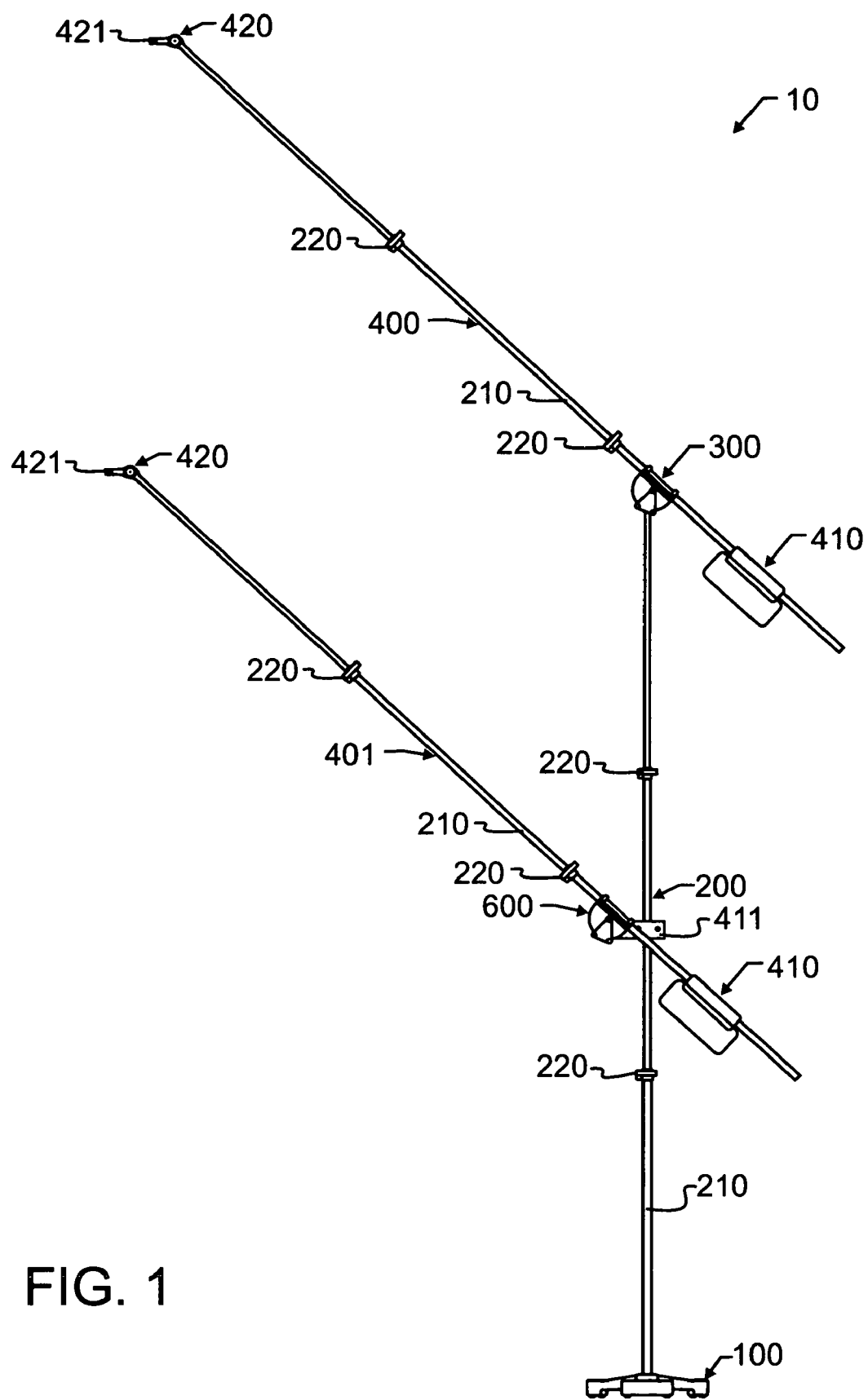
FIG. 1 illustrates a preferred embodiment designed in accord with the teachings of the present invention from a side plan view.

Manifested in the preferred embodiment, the present invention provides a boom stand 10 which is adapted to support one or more of a variety of known devices thereon. More specifically, but not limited thereto, microphones, cameras, lights, medical equipment, and many other devices may be supported therefrom. For reasons to be explained herein below, the support of sensitive electrical or electronic equipment is most preferred, especially pertaining to microphones, but the application of the present invention is not solely limited thereto and is instead contemplated by the present inventors to have other applications as well.

Boom stand 10 includes a base 100 which is designed to support boom stand 10 upon a floor or other surface. Most preferably, though not an absolute requisite, the floor or other surface will be relatively planar or flat, at least in the region adjacent to base 100. This permits base 100 to be formed with points of contact all in a planar relationship, thereby removing any need for special supporting contact points or leveling feet or the like. Arising from base 100 is a stand 200, which in the preferred embodiment boom stand 10 is an extension stand comprising several telescoping segments such as segment 210 separated and locked into place by locking members 220. At the top of stand 200 distal to base 100 is a pivoting boom support clamp 300, carrying thereon a boom 400. Boom 400, like stand 200, may in the preferred embodiment include a plurality of telescoping tubular sections such as section 210 interconnected and held in relative placement by additional locking members 220. At the end of boom 400 closest to the load to be supported, a separate pivotal joint 420 may be provided with a stub or additional coupler 421. To this coupler 421 any of a wide variety of already known component supports may be attached, the details which are not critical to the proper operation of the present invention. Exemplary thereof and incorporated herein by reference for the teaching thereto are such patents as U.S. Pat. No. 4,396,807 to Brewer, as well as the other patents mentioned herein above which provide similar teachings for component support from a boom arm. Distal to coupler 421 is an adjustable counterweight 410, which is preferred to maintain balance across boom 400.

An optional boom 401 may be provided, which is functionally and structurally similar to boom 400, and which has therefore, where appropriate, been numbered with like numbers. However, rather than mounting directly to the top of stand 200, boom 401 may be clamped about stand 200 through a clamp 411, which in the preferred embodiment will include suitable mating or coupling into auxiliary boom clamp 600. It will be apparent that one or more optional booms 401 may be provided at various vertical locations upon stand 200, and the use of more than one such boom 401 is contemplated herein, depending upon the needs of the user for a given application. Additionally, optional boom 401 may serve as a retrofit for existing stands from the prior art, and application of boom 401 is therefore not solely limited to use with the specific additional features found in the preferred embodiment boom stand 10.

Figure 2:
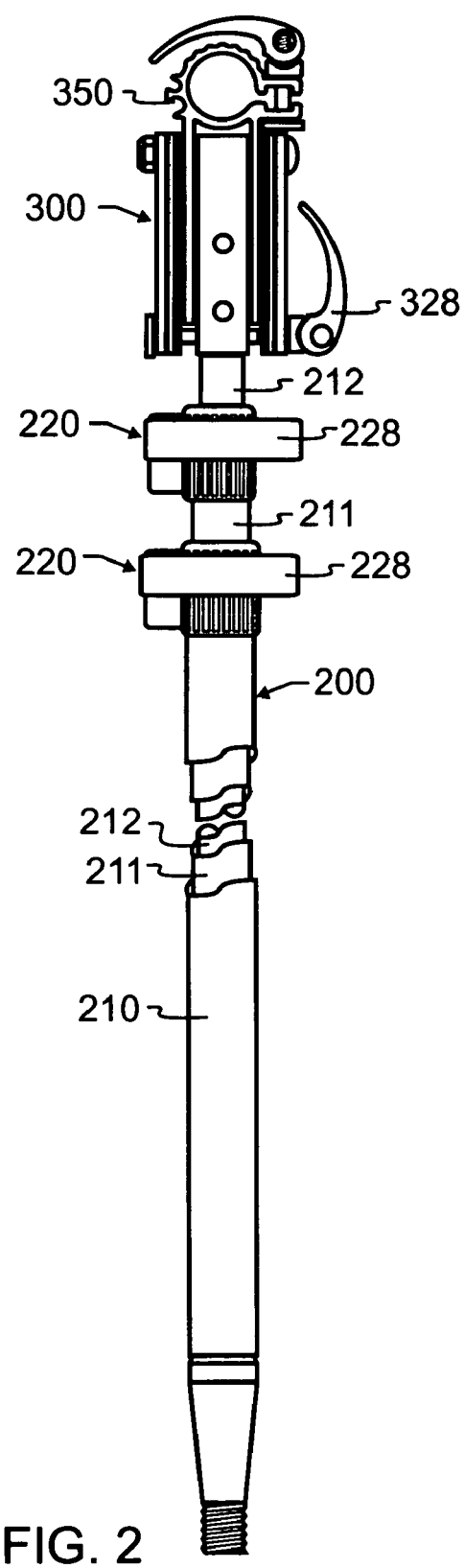
FIG. 2 illustrates a stand assembly used in the preferred embodiment of FIG. 1 in a collapsed configuration from a front view.
Figure 3:
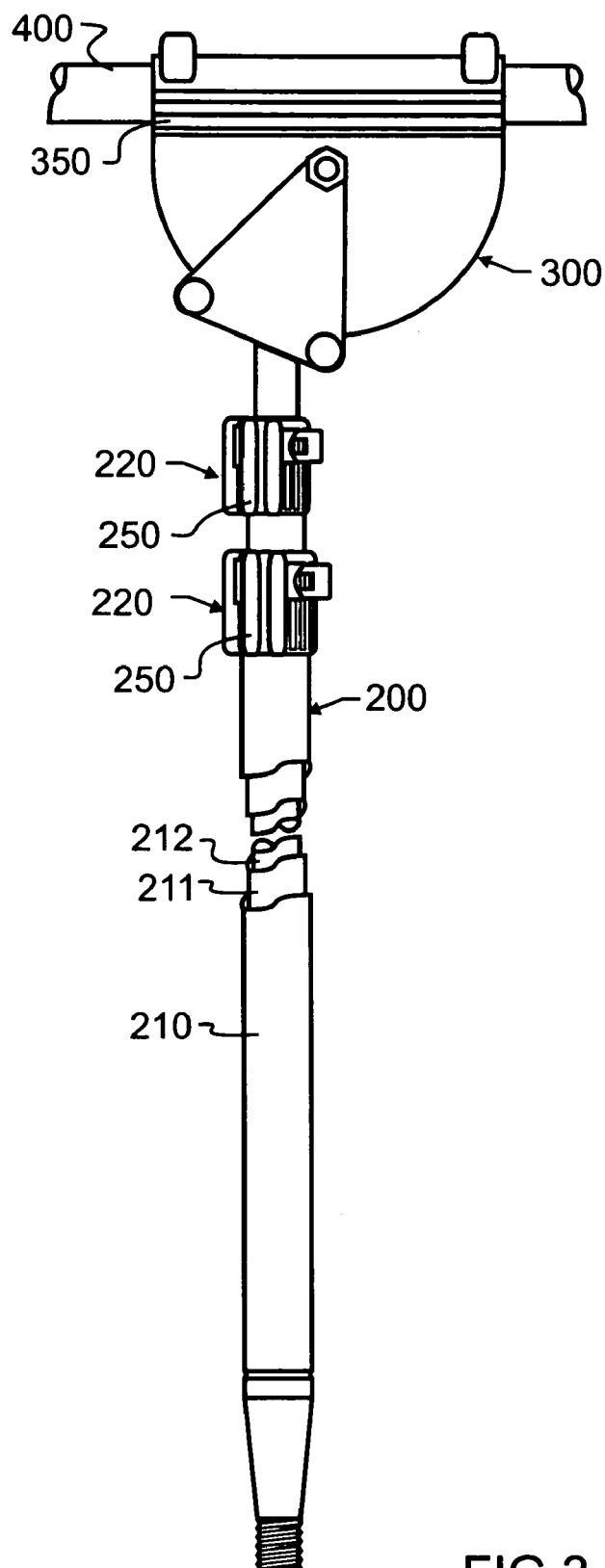
FIG. 3 illustrates the stand assembly of FIG. 2 from a side view and showing the boom inserted therein.

The specific arrangement and construction of stand 200 and pivoting boom support clamp 300 are better visible in FIGS. 2 and 3, which show the stand and clamp separate from base 100 and many of the features of boom 400. From FIG. 2, the concentricity of the various telescoping tubes are illustrated, showing outer tube 210 and two inner tubes 211 and 212. Clamps 220 are provided which lock immediately adjacent tubes together to set a fixed physical or positional relationship therebetween. For example, clamp 220 may be used to lock outer tube 210 to the next inner tube 211, and a like clamp 220 may be used to retain tube 211 to tube 212. The number of telescoping segments and associated clamps 220 are not critical to the functioning of the invention, but provide desired flexibility of application in combination with relatively low weight and high strength. At the uppermost point of stand 200, in this case on extension tube 212 distal to clamp 220, is most preferably a pivoting boom support clamp 300, which will be explained in more detail herein below. This clamp serves as an adjustable coupling between stand 200 and boom 400.

Figure 4:
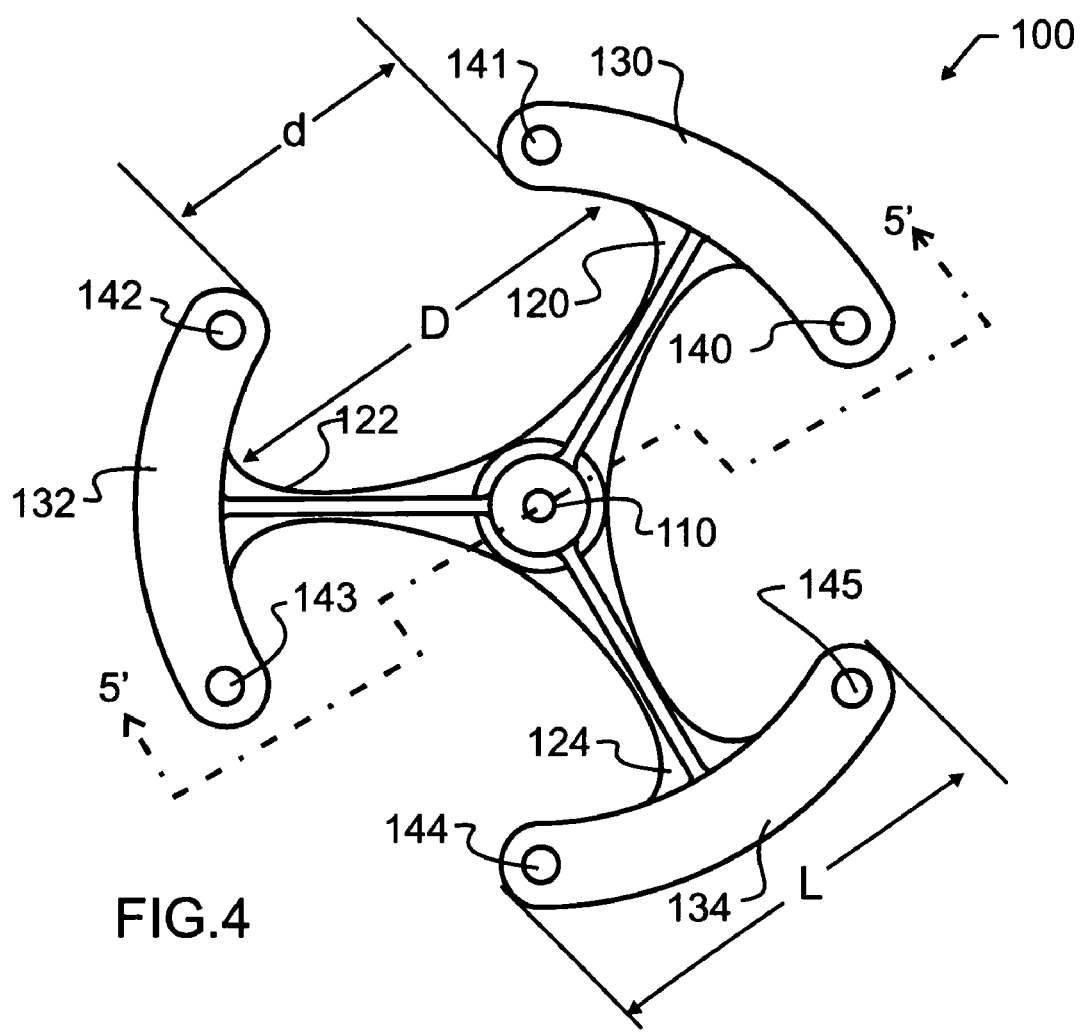
FIG. 4 illustrates a preferred base from a bottom view, designed in accord with the teachings of the present invention and operable in association with the stand assembly of FIG. 2.
Figure 5:
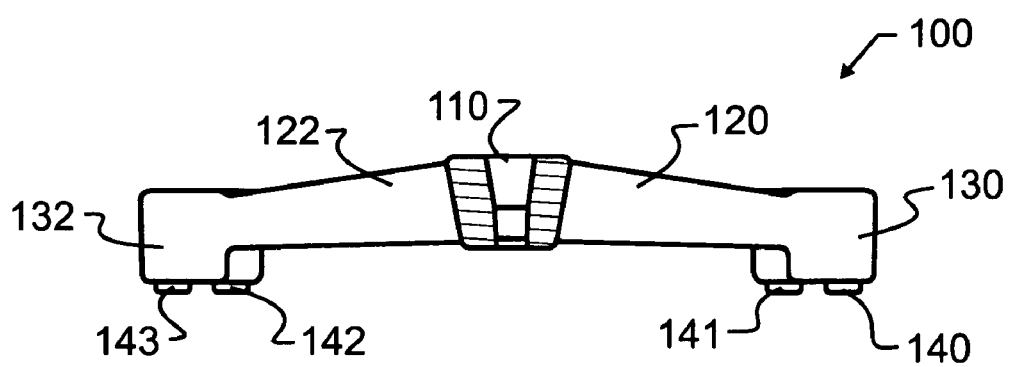
FIG. 5 illustrates the base assembly of FIG. 4 from a sectional view taken along line 5' of FIG. 4.

FIG. 4 illustrates a most preferred embodiment base 100 designed in accord with the teachings of the present invention. Base 100 most preferably includes three arcuately shaped massive anchors 130, 132, 134 that are extending at the ends of arms 120, 122 and 124 respectively, each distal to the center hole 110 of base 100. Center hole 110 is provided to engage, by thread or other known coupling technique, with a stand such as stand 200 of FIG. 1. While the number and arrangement of contact feet are not critical, six feet 140–145 are illustrated. In the most preferred embodiment, these feet 140–145 are preferably elastomeric, such as from rubber or other similarly resilient compounds, to provide a desired combination of vibration isolation between base 100 and a supporting floor or surface, and also to provide some degree of friction therebetween to provide a more secure anchor. Nevertheless, these rubber or elastomeric feet 140–145 may be replaced with casters or wheels, which will permit boom stand 10 to be used in applications where a wheeled stand is preferred, such as for IV stands, electronic equipment, or for other diverse use.

Figure 15:
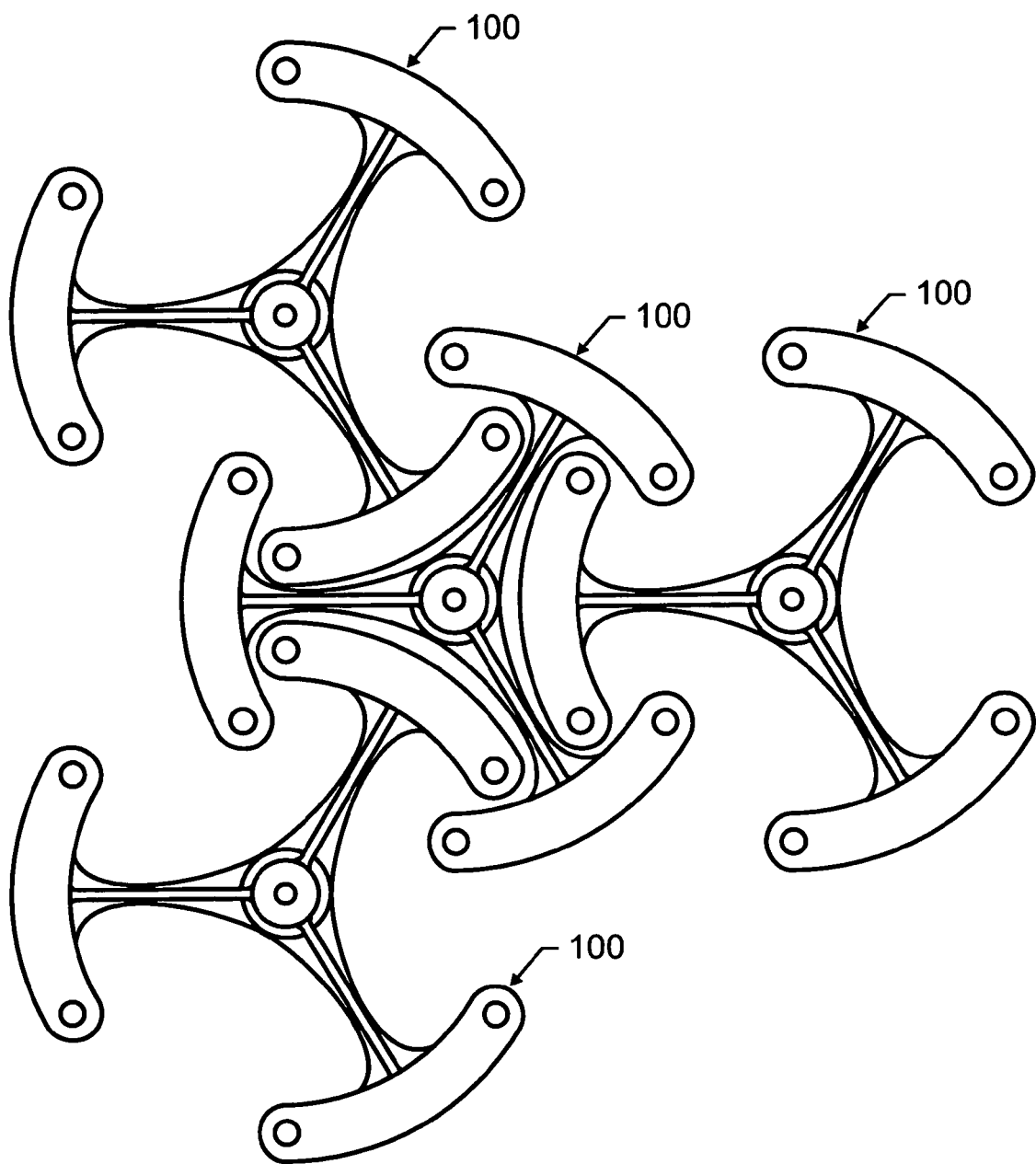
FIG. 15 illustrates a plurality of preferred bases of FIG. 4 from a bottom view.
Figure 24:
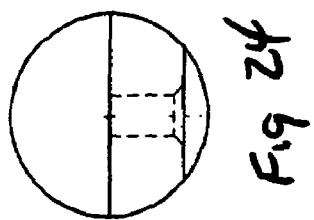
FIGS. 23, 24, 25, 26 and 27 illustrate a preferred microphone-end swivel half from side, end, bottom, top and opposed end views, respectively.
Figure 26:
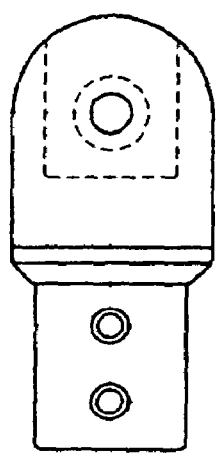
Figure 23:
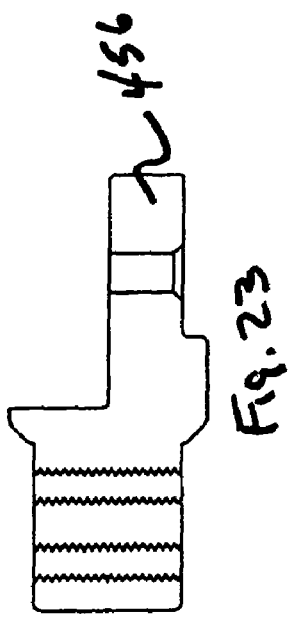
Figure 25:
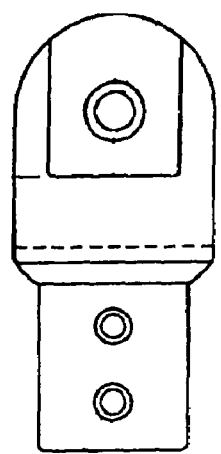
Figure 27:
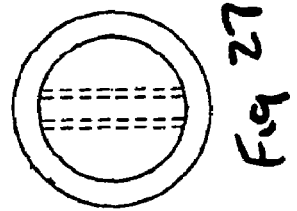
Figure 29:
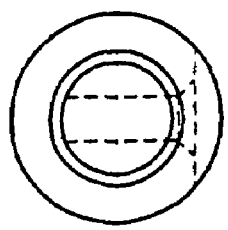
FIGS. 28, 29, 30, 31 and 32 illustrate a preferred tube-end swivel half from side, end, bottom, top and opposed end views, respectively.
Figure 31:
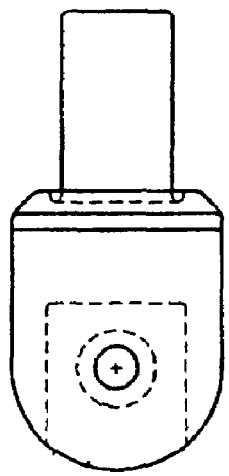
Figure 28:
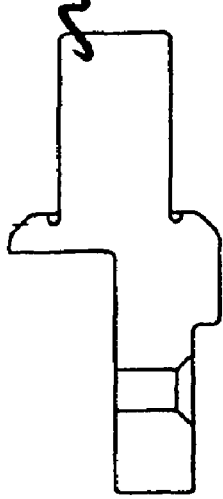
Figure 30:
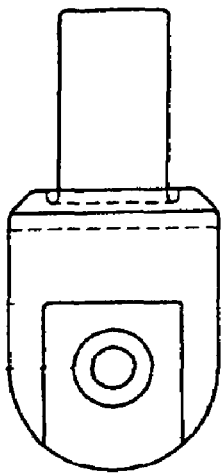
Figure 32:
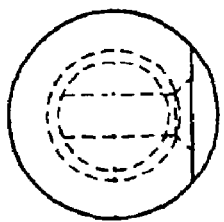

Base 100 will also have several important dimensional relationships or proportions which offer significant additional utility. As illustrated in FIG. 4, arcuately shaped massive anchor 134 has a length denoted by L. Most preferably, this length L is greater than the opening d between two adjacent arcuately shaped massive anchors 130, 132. Length L will also most preferably be less than the maximum width D within an opening bounded by between adjacent arcuately shaped massive anchors 130, 132, legs 120, 122, and adjacent surface such as a floor. By adhering to these ranges, it is possible to stack a plurality of boom stands 100 in much closer arrangement than was heretofore available in the prior art. The most critical of the relationships is that of the length L being smaller than D, to permit at least one arcuately shaped massive anchor such as anchor 134 to fit within the partially bounded region spanned by the maximum width D. Furthermore, and as illustrated, it is also possible to gently curve the transition from adjacent arms to each other, and thereby form a curve therebetween which is roughly comparable to the outer perimeter of at least one arcuately shaped massive anchor. This most preferred stacking arrangement is specifically illustrated from a bottom view in FIG. 15, which illustrates four bases 100 nested together, wherein stands 200 supported thereon will each be spaced from another by just more than the single radius of base 100, rather than by a full diameter as was heretofore typical in the art.

As maybe apparent, to obtain the greatest anchoring capability, it is generally desirable to make arcuately shaped massive anchors 130, 132, 134 relatively large, to thereby increase the total mass. Consequently, it may be desired for a particular application to expand L. However, most preferably, at least one of the arcuately shaped massive anchors 130, 132, 134 will still remain small enough to fit within the outer perimeter defined by adjacent arcuately shaped massive anchors 130, 132, 134. In other words, at a minimum d should be no less than an amount required to fit at least one of legs 120–124 within d. The maximum length of legs 120–124 will be determined by the desire to avoid creating a tripping hazard. As is known, as these legs are increased in length, there is a correspondingly greater probability that a person or other object may collide with base 100, potentially toppling boom stand 10. While the spacing between legs 120, 122 and 124 is illustrated as being such that each leg subtends a one hundred and twenty degree arc with each adjacent leg, the exact spacing is not critical to the invention, nor is the identical size or spacing. While these consistent sizes and angular relationships are preferred since any of the arcuately shaped massive anchors 130, 132, 134 may be dropped between like legs of any other like boom stand base, this is not an essential requisite but merely a significant convenience to better enhance the ease of use of the present invention. Varying sizes and angular relationships which would otherwise force placements in specific orientations are also contemplated herein, though recognized as being generally less desirable. Furthermore, the arcuately shaped massive anchors 130, 132, 134 need not be continuous arcs as shown, but may also be further subdivided or may be of irregular geometry. Likewise, the mounting of legs 120–124 to anchors 130–134, which in the preferred embodiment base 100 places the legs 120–124 at midpoints of each arcuately shaped massive anchors 130, 132, 134, is similarly optional and may be varied to place the legs at any reasonable supporting orientation.

Figure 6:
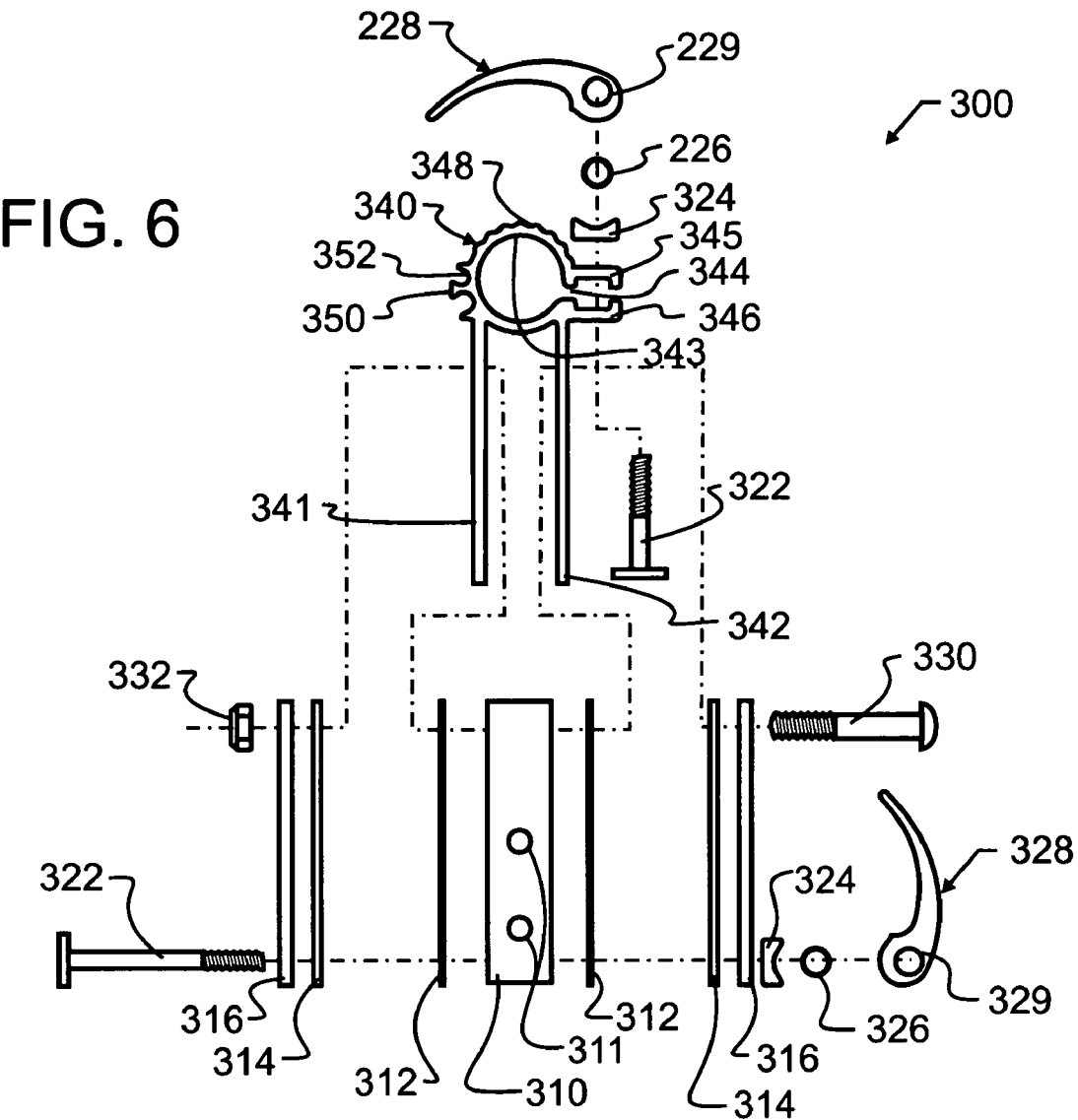
FIG. 6 illustrates a preferred embodiment clamping apparatus designed in accord with the teachings of the present invention and used in the preferred embodiment of FIG. 1 from an exploded assembly view.
Figure 8:
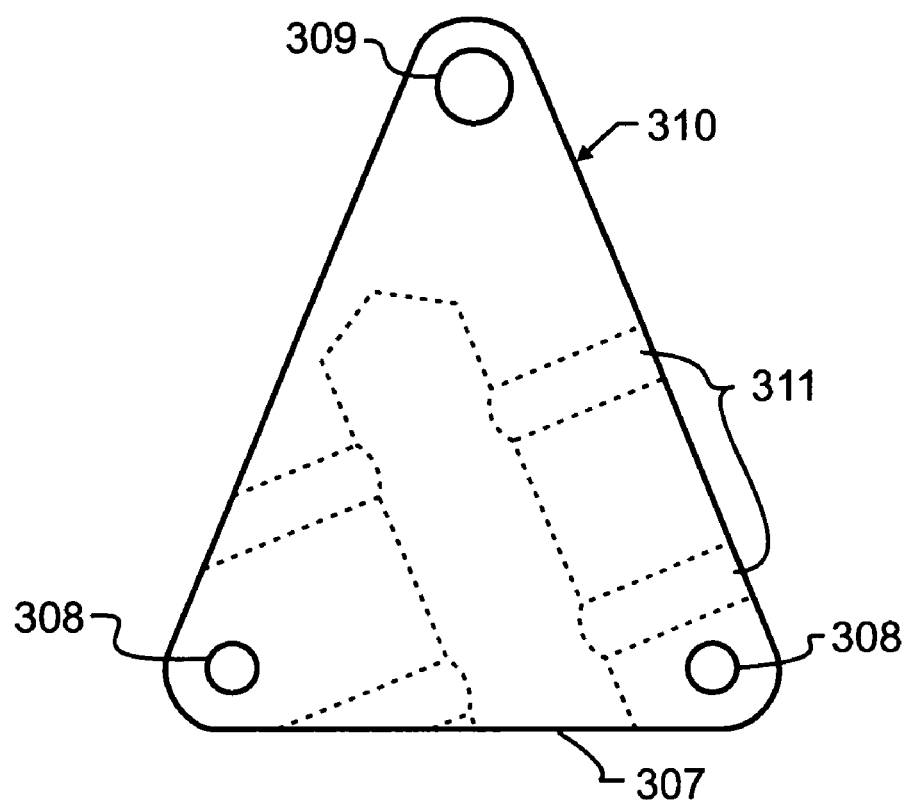
FIGS. 8 and 9 illustrate a preferred embodiment pivot block operable with the preferred embodiment clamping apparatus of FIG. 6 from side and end views, respectively.
Figure 9:
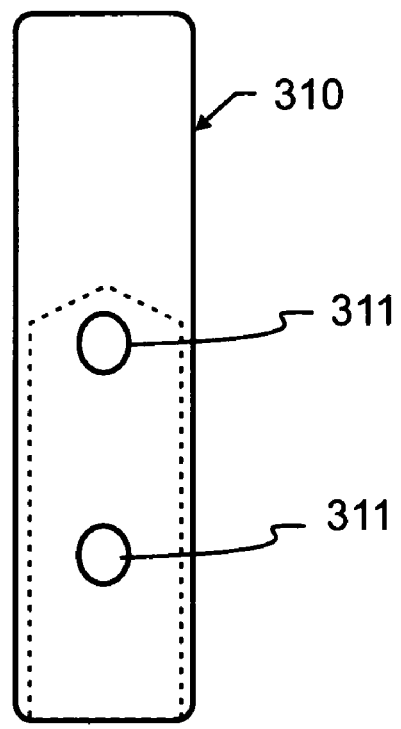

FIG. 6 illustrates pivoting boom support clamp 300 by exploded view in much greater detail. As may be seen therein, a core or pivot block 310 is adapted for mounting onto an end of a stand or extension and may be retained thereon through the insertion of fasteners into holes 311, or by other suitable means. FIGS. 8 and 9 illustrate the pivot block 310 from side and end views, respectively. As visible in FIG. 8, pivot block 310 includes an opening 307 which is designed to receive the stand or extension such as extension 212 in the present invention. To retain pivot block 310 thereon, holes 311 are provided through which pins, bolts or other fasteners may pass to engage with the stand or extension.

Figure 10:
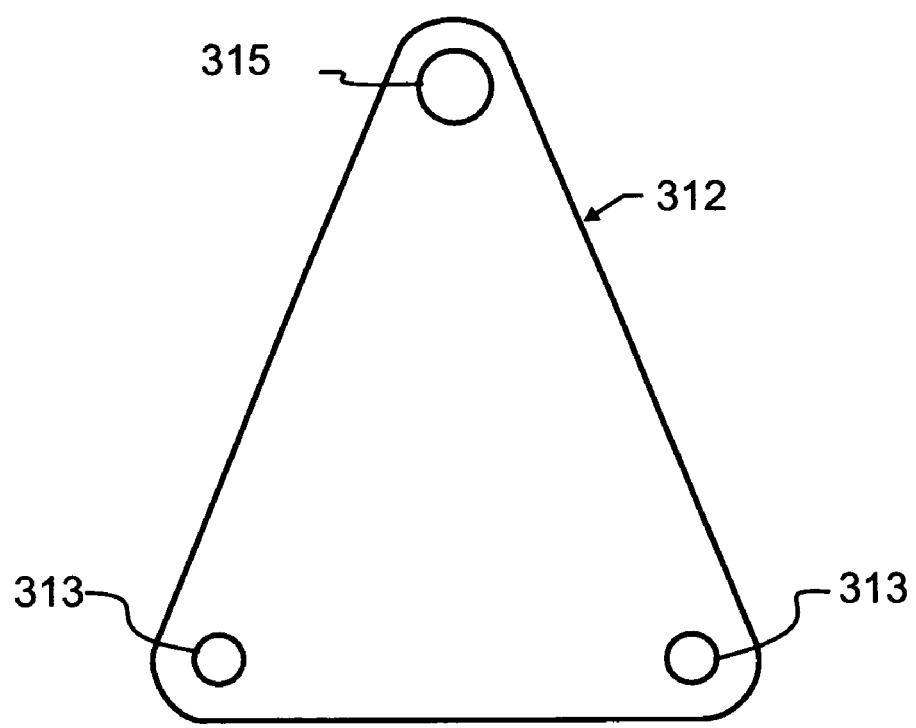
FIGS. 10 and 11 illustrate the outlines of preferred embodiment brake pad backers and brake pads operable with the preferred embodiment clamping apparatus of FIG. 6 from side and end views, respectively.
Figure 11:
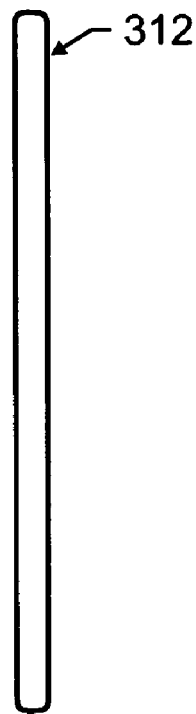

Adjacent pivot block 310 are two optional brake glides 312 which may be of any material, but which in the preferred embodiment are most preferably polymeric and potentially elastomeric. Most preferably each of the brake glides 312 has a side and end view as illustrated in FIGS. 10 and 11, which most desirably resembles the outline of pivot block 310. Adjacent to these brake glides 312 are discs 341, 342 which extend from a clamp body 340. Surrounding discs 341, 342 are brake pads 314, which most preferably have an outline resembling that of brake glides 312, and which are finally sandwiched by brake pad backers 316 once more having that same or a similar outline. Bolt 330 and nut 332 pass through the various holes such as holes 309 in pivot block 310 and hole 315 in brake glides 312 to form a pivotal axis about which clamp body 340 may pivot relative to pivot block 310 and the remainder of components 310–316.

Two bolts 322 pass through various holes such as holes 308 in pivot block 310, holes 313 in brake glides 312, and similar holes in brake pad backers 316. Bolts 322, in combination with pairs of bearings 324, a dually-threaded pivot pin 326 and a single handle 328 provide an over-center clamp which, through the pivotal motion of handle 328, may be used to apply a braking effect to the pivoting boom support clamp 300. Threaded pivot pin 326 in the preferred embodiment has a cylindrical body which is threaded at two places in a direction radial to the longitudinal cylindrical axis. A bolt 322 may be threaded through each one of these threaded holes in threaded pivot pin 326, but not until after threaded pivot pin 326 is passed within hole 329. Once at least one bolt 322 is threaded into threaded pivot pin 326, threaded pivot pin 326 will no longer be removable from hole 329. However, as may be visible in FIG. 6, hole 329 is offset slightly from centered on handle 328, such that rotary motion of handle 328 about the longitudinal axis of threaded pivot pin 326 will vary the distance between threaded pivot pin 326 and bearing 324. Handle 328 must, of course, be designed to permit the passage of bolt 322, as is shown by the two notches 327 in FIG. 13. When two bolts 322 are threaded the proper distance into threaded pivot pin 326, then handle 328 will in one position allow relatively unrestricted pivoting between clamp body 340 and pivot block 310. This would be rotated significantly from that shown in FIG. 6. However, when in the position shown, the extra space between threaded pivot pin 326 and bearing 324 will draw bolt 322 closer to bearing 324, and will consequently serve to compress each of the elements 310–316. Such compression will lead to substantial resistance to pivotal motion between clamp body 340 and pivot block 310. In other words, with handle 328 in the position illustrated in FIG. 6 and also in FIG. 2, this will represent a locked position which prevents this pivotal motion.

The use of materials which are at least somewhat elastomeric for brake glides 312 and brake pads 314 enables two very desirable benefits. First of all, the characteristics of engagement can be very precisely controlled to obtain, with the simple rotation of handle 328, a predictable and repeatable variation in the amount of friction between boom 400 and stand 200. Consequently, depending upon the intended boom load, these forces can be carefully controlled to give an ideal characteristic, or these forces may be selected to provide a general characteristic suitable for many diverse loads. Higher frequency vibrations that may be induced into stand 200 will tend to be damped by the elastomeric material between block 310 and clamp body 340, which is also beneficial in some applications. Nevertheless, it will be understood that the characteristics and functions may be incorporated unitarily into the materials, compositions or structures of the adjacent components. In such case, it will be most preferred to preserve the performance benefits that are associated herewith to obtain the full benefit of the invention, though it will be recognized that there may be applications where not all of the features are required. Consequently, for a given application, some of the features may be sacrificed to reduce manufactured cost, piece part count, or for other reasons or benefits which will be recognized by those reasonably skilled in the art.

Clamp body 340 has other significant features in the preferred embodiment boom stand 10, including an interior surface 343 through which boom 400 may pass. Interior surface 343 may be caused to apply force to boom 400 using an over-center mechanism which includes the same or very similar components 322 and 324, and also a similar pin 226, and a handle 228 having a pin 229 therein. Handle 228 is illustrated in FIG. 12, and, as apparent therein, differs from handle 338 by being somewhat narrower and only including a single slot 227 as opposed to the dual slots 327 of handle 328. Owing to the presence of a small gap 344, when the over center clamp handle 228 is pivoted from an open position to a closed one, gap 344 may be diminished and forces may be applied from interior surface 343 to boom 400. Protrusions 345 and 346 provide adequate mounting for this second over-center mechanism. Clamp body 340 additionally has an exterior surface 348 which includes two wire or cable guides 350, 352. These cable guides will most preferably permit the elastic retention of cables or wires therein, typically by slight deformation of the vinyl or similar insulation on the exterior of the cable as the cable is pressed into these guides 350, 352. These guides then permit one or more cables to be retained readily upon clamp body 340, thereby avoiding loose cables and the potential risks and endangerment that would otherwise be associated therewith.

Figure 7:
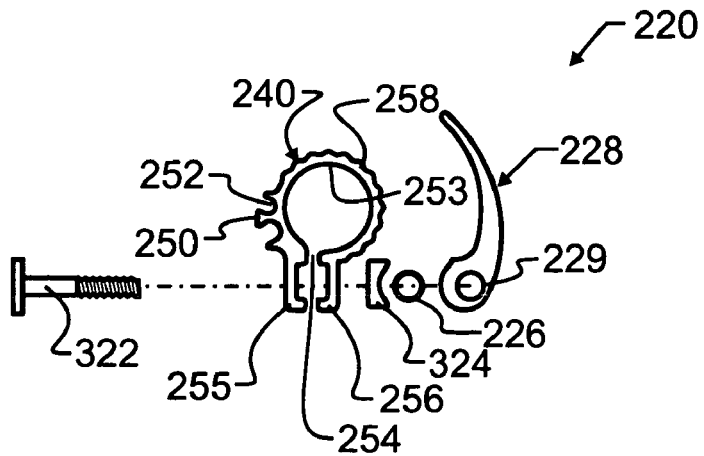
FIG. 7 illustrates a preferred embodiment stand extension clamp designed in accord with the teachings of the present invention from a top exploded view.

FIG. 7 illustrates a preferred embodiment clamp 220 from an end view. Once again, an over-center clamp is illustrated, using similar or like components 322, 324 and 226, 228, 229. It should be noted herein that these components may be identical or different in final dimension or even geometry, but are numbered identically herein to illustrate like function. Similarly, and upon a review of the present disclosure, others of a myriad of hardware assemblies will be recognized as suitable in substitute for these components. Nevertheless, and in accord with the requirements of the statutes, these are illustrated herein to enable an understanding of the present inventive concept. In the case of clamp 220, a clamp body 240 most preferably has been extruded through an extrusion die, thereby ensuring a substantially consistent cross-section taken transverse to the longitudinal axis of clamp body 240. For the purposes of the present disclosure, it will be understood herein that "substantially consistent" includes the subsequent drilling of holes to permit the insertion of bolt 322 and the like, since such alterations do not degrade or detract from the basic operation of clamp body 240. Most preferably formed unitarily within clamp body 240 is at least one, and in the preferred embodiment, two cable guides 250, 252 which have operation and function similar to guides 350, 352. In operation very much like clamp body 340, clamp body 240 has an interior surface 253, a small gap 254 which may be compressed, reduced or closed, and surfaces 255, 256 which facilitate the control of gap 254 in association with clamping components 322, 324, 226, 228 and 229. Clamp 220 is designed to circumscribe a tube having a longitudinally cut or split end which, as a result of the material that has been removed, can be squeezed into a smaller diameter. If a region adjacent the end of a tube is provided with longitudinally extending cuts 214 visible in FIG. 14, and is further provided with a reduced diameter 215 adjacent the end but separated therefrom by only a small amount, then the present clamp 220 may be placed thereabout, the over-center mechanism attached and set to the proper tension, and clamp 220 will then stay in position about the reduced diameter region 215. The transition 216 from reduced diameter 215 to slightly greater diameter at the very end of the tube will retain clamp 220 onto the tube, and the increase in diameter will provide a slight curve to transition 216 which will benefit interaction with an inner tube. This combination of staying attached onto the end of the tube and improved interaction with inner tubes is most preferred. In a yet further embodiment, the tube such as tube 210 may be swaged and, though swaging normally is strived to be symmetrical, in the preferred embodiment the swaged end may be specifically designed to be slightly asymmetric at the end mating with a clamp, such that material extends slightly into gaps such as 254 and 344. This prevents rotation between the clamps and tube passing there through. Nevertheless, in a preferred embodiment as shown in FIG. 14, the end of tube 210 has a small extension outside of or at a greater radius than the primary body of tube 210, which is shown in FIG. 14 as key 217. Most preferably, key 217 will extend into the gaps such as 254 and 344 to prevent rotation.

FIGS. 16 and 17 illustrate in much greater detail a preferred embodiment joint 420 and coupler 421 of FIG. 1, though it will be understood that other suitable couplers and joints may also be incorporated herein to obtain the intended operation of the remainder of components. As best visible in FIG. 16, coupler 421 is most preferably connected to joint 420 through a microphone pivot clamp 540 which is operated by handle 528 in association with clamping components 522, 524, 526, and 529, the functional operation which is essential identical to clamping components 322, 324, 226, 228 and 229, the operation of which has been discussed herein above.

Clamp 540 is shown in much greater detail in FIGS. 18–22, and includes a receiver, which may be an opening or a cavity which permits the head of coupler 421 to be received therein for rotary movement. When the clamping components 522, 524, 526, 528 and 529 are actuated to clamp, force is applied to the head of coupler 421, preventing or providing substantial resistance to rotary movement. However, when clamping components 522, 524, 526, 528 and 529 are actuated to release, coupler 421 is sufficiently released to move through a rotation, but is not released in an axial direction, and so is consequently retained within clamp 540.

An additional alternative cable clamp 550 is illustrated, which may be used with or instead of the cable clamps 250, 252, 350, and 352 illustrated herein above. In the most preferred embodiment, cable clamp 550 has a V-shaped opening, best visible in FIG. 18, which is adapted to progressively receive one or a plurality of cables therein. Most preferably, small undulations or diameter curves may be provided which correspond to specific diameters of cables. These undulations will thereby permit a particular smaller size of cable to be nested most deeply within cable clamp 550, while the largest diameter cable will be nested in and retained at the outer, or as shown in FIG. 18, top portion of cable clamp 550. The undulations or curves ensure that the cables must be inserted with light force, and will consequently be retained therein to prevent the release therefrom. Said another way, the V cross-section is most preferably inconsistent, whereby the spacing between the walls while overall gradually decreasing, on a smaller scale alternatively increases and decreases through several repetitions of increase and decrease. With each increase following a decrease, a cable will consequently be retained within the increased gap.

FIG. 17 best illustrates joint 420, including similar clamping components 422, 424, 426, 428 and 429, which are actuated to clamp the microphone-end swivel 456 to the tube-end swivel 455, and thereby control relative rotation therebetween. FIGS. 23, 24, 25, 26 and 27 illustrate a preferred microphone-end swivel half 456 from side, end, bottom, top and opposed end views, respectively, while FIGS. 28, 29, 30, 31 and 32 illustrate a preferred tube-end swivel half 455 from side, end, bottom, top and opposed end views, respectively. The materials used for these swivel halves 455, 456 may be selected once again for particular properties or characteristics as desired, and as discussed with respect to components 310–316 herein above.

Figure 34:
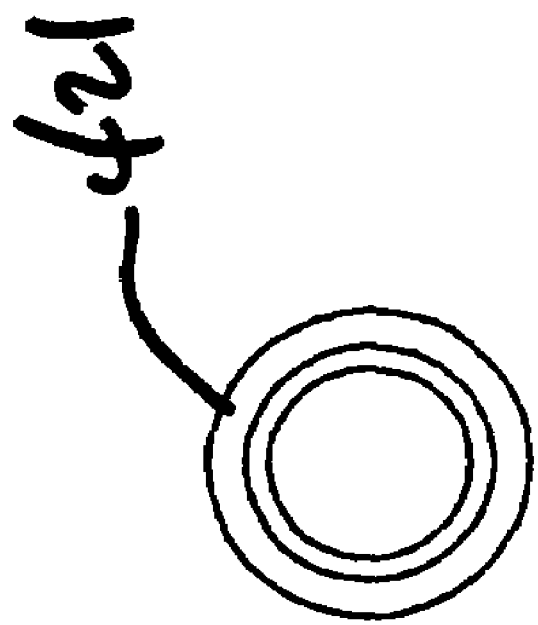
FIGS. 33 and 34 illustrate a preferred microphone pivot pin from side and end views, respectively, designed in accord with the teachings of the present invention and operable in association with the preferred coupler of FIGS. 16 and 17.
Figure 33:
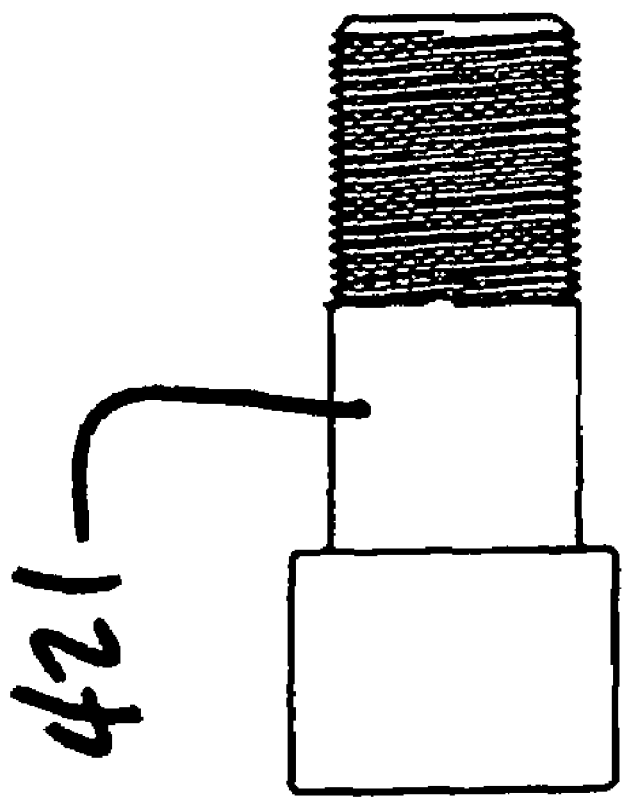

FIGS. 33 and 34 illustrate a preferred microphone pivot pin from side and end views, respectively, designed in accord with the teachings of the present invention and operable in association with the preferred coupler 420 and clamp 540.

Figure 35:
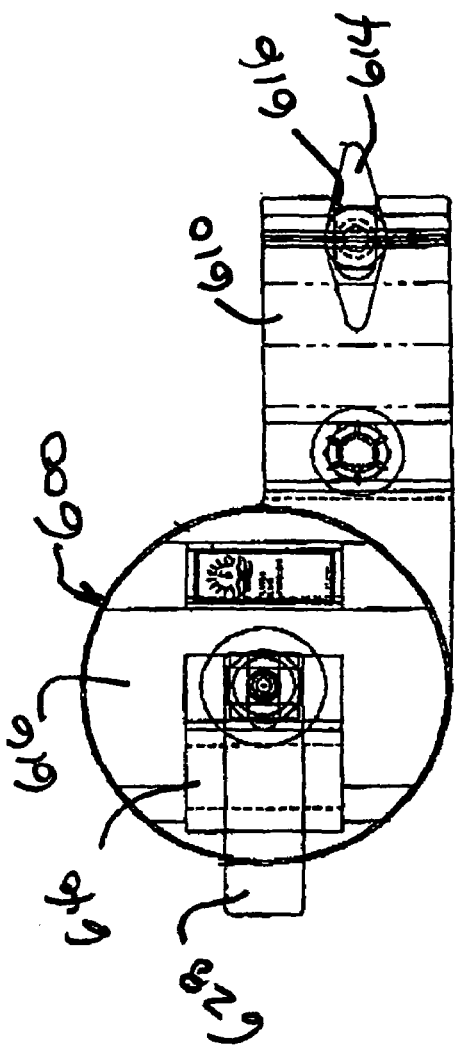
FIGS. 35 and 36 illustrate a preferred auxiliary boom clamp assembly from side and top views, respectively, designed in accord with the teachings of the present invention and operable in association with the preferred boom stand 10 of FIG. 1.
Figure 36:
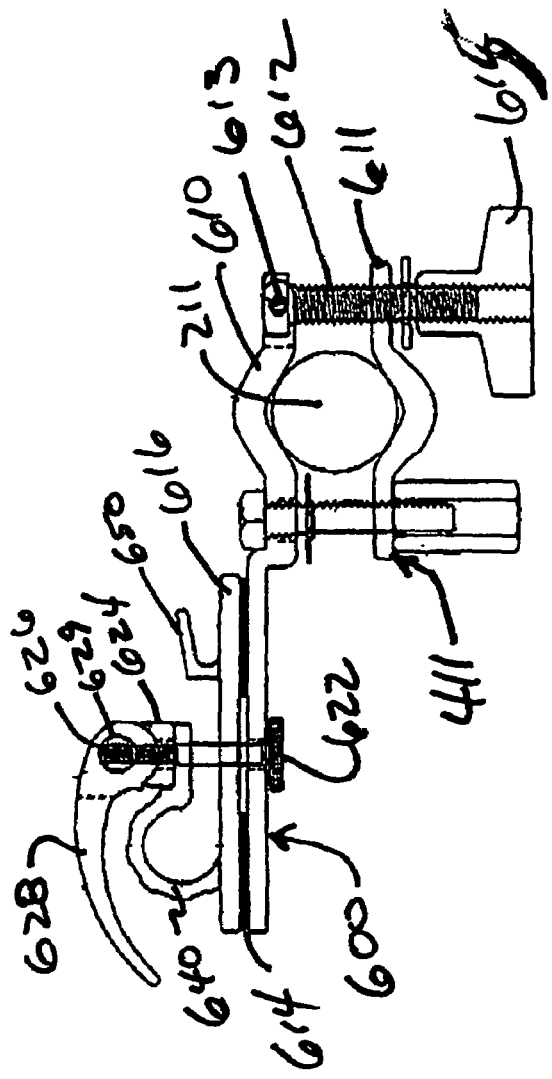

FIGS. 35 and 36 illustrate the auxiliary boom clamp assembly including auxiliary boom clamp 600 and auxiliary clamp 411. As is most apparent from FIG. 36, first and second opposed clamp brackets 610 and 611 surround inner tube 211. Through the force of handle 615 rotated about screw 612, which causes handle 615 to draw towards pivot 613, clamp brackets 610 and 611 may be caused to squeeze about inner tube 211. When in the position shown in FIG. 36, where handle 615 is spaced from clamp bracket 611, handle 615 and screw 612 may be rotated about pivot 613 through a substantial arc, such as a full ninety degree counterclockwise rotation. This movement will permit auxiliary clamp 411 to be removed from inner tube 211.

Supported distal to screw 612 on clamp bracket 610 is auxiliary boom clamp 600. Auxiliary boom clamp 600 uses over-center components that are functionally similar or identical to those already described herein above with reference to clamping components 422, 424, 426, 428 and 429, but which are numbered within this assembly as clamping components 622, 624, 626, 628 and 629. The action of these clamping components is to squeeze together and lock or alternatively pivotally release rotary plate 616, brake pad 614, and clamp bracket 610. In the preferred embodiment auxiliary boom clamp 600, a rubber or elastomeric material will most preferably be used for brake pad 614, which provides an excellent combination of friction and offers potential vibration dampening. The clamping components will additionally squeeze clamp body 640 about the auxiliary boom tubing to retain it therein. A cable guide 650 which is functionally equivalent to cable guide 550 is also preferably provided.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A microphone boom stand uniquely adapted to provide both rigid support and vibration damping, comprising:
    a base;
    a riser stand rising from said base;
    a boom adapted to support a microphone in a location horizontally displaced from said riser stand;
    a clamp having a pivoting arrangement and having a clamping arrangement securing said boom to said stand, said clamping arrangement operative when said clamping arrangement is in a first position to permit relative motion between said boom and said riser stand and said clamping arrangement operative when said clamping arrangement is in a second position to prevent relative motion between said boom and said riser stand, said clamp having a fixed member, at least one rotary disc, and at least one elastomeric member that is in frictional engagement between said fixed member and said at least one rotary disc when said clamping arrangement is in said second position;
    at least one extension coupled to said riser stand and retractable and alternatively extendable relative to said riser stand;

an extension lock for locking said riser stand concentrically about said extension to form a generally fixed mechanical relationship therebetween, said extension lock comprising:
  a substantially constant operative cross-sectional shape between a first longitudinal end and a second longitudinal end distal to said first longitudinal end when cut transverse to a longitudinal axis and having an inner surface operative to apply compressive forces against said riser stand and an exterior surface; and
  a means for compressing said inner surface; and
a cord retention clip formed unitarily with said extension lock adjacent said extension lock exterior surface, operatively extending between said first longitudinal end and said second longitudinal end, and adapted to elastically retain an electrical cord therein.

2. The microphone boom stand of claim 1, wherein said clamp further comprises a means for applying a compressive force between said at least one rotary disc, said at least one elastomeric member and said fixed member.

3. The microphone boom stand of claim 2, wherein said means for applying a compressive force further comprises at least one over-center clamp beyond an outer radius of said rotary disc.

4. The microphone boom stand of claim 1, wherein said base further comprises:
  first, second and third arms extending radially from a center point and subtending a circle into similar angular displacements;
  first, second and third massive anchors attached on the respective ends of said first, second and third arms each at a location distal to said center point, and extending generally arcuately and discontinuously about a circular circumference generally concentric with said center point, each of said first, second and third massive anchors spaced from adjacent massive anchors by an amount greater than required to permit at least one of said first, second and third arms to pass therebetween and spaced from adjacent massive anchors by an amount less than a distance required to pass the maximum dimension of said first, second and third massive anchors therebetween.

5. A boom stand clamp in combination with a boom stand, said boom stand having a base, a microphone support, and a riser stand rising from said base to said microphone support and having a first boom stand tube and a second boom stand tube, said boom stand clamp comprising:
  a substantially constant operative cross-sectional shape between a first longitudinal end and a second longitudinal end distal to said first longitudinal end when cut transverse to a longitudinal axis;
  an inner surface operative to apply compressive forces;
  an exterior surface;
  a means for compressing said inner surface having a first state operative to apply compressive forces sufficient to clamp said first boom stand tube concentrically about said second boom stand tube to form a generally fixed mechanical relationship therebetween and a second state operative to release said compressive forces to permit relative motion between said first boom stand tube and said second boom stand tube; and
  a cord retention clip formed unitarily with said clamp adjacent said exterior surface, operatively extending between said first longitudinal end and said second longitudinal end, and adapted to elastically retain an electrical cord therein.

6. The boom stand clamp of claim 5, wherein said compressing means further comprises an over-center mechanism for compressing said inner surface.

* * * * *